US 7,359,734 B2
(12) United States Patent
Ylitalo

(10) Patent No.: US 7,359,734 B2
(45) Date of Patent: Apr. 15, 2008

(54) COMPENSATING FOR RADIATION PATTERN IN RADIO SYSTEM, AND RADIO SYSTEM

(75) Inventor: Juha Ylitalo, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/527,986

(22) PCT Filed: Sep. 24, 2002

(86) PCT No.: PCT/FI02/00765

§ 371 (c)(1),
(2), (4) Date: Mar. 21, 2005

(87) PCT Pub. No.: WO2004/030147

PCT Pub. Date: Apr. 8, 2004

(65) Prior Publication Data

US 2006/0019710 A1    Jan. 26, 2006

(51) Int. Cl.
*H04M 1/00* (2006.01)
(52) U.S. Cl. ............... 455/562.1; 455/272; 455/277.2; 342/373
(58) Field of Classification Search ............... 455/272, 455/277.2, 562.1; 370/294; 342/373
See application file for complete search history.

(56) References Cited

U.S. PATENT DOCUMENTS 5,083,131 A     1/1992   Julian
5,784,031 A *   7/1998   Weiss et al. ............... 342/373
5,920,809 A *   7/1999   Clarke ....................... 455/272
5,940,032 A     8/1999   Passmann et al.
6,735,182 B1 *  5/2004   Nishimori et al. ......... 370/294
6,865,402 B1 *  3/2005   Gilbert ................... 455/562.1
6,980,782 B1 * 12/2005   Braun et al. ............. 455/277.2

FOREIGN PATENT DOCUMENTS

GB      2 313 523      11/1997
WO      WO 00/55938    9/2000

OTHER PUBLICATIONS

T. J. Peters, "A conjugate gradient-based algorithm to minimize the sidelobe level of planar arrays with element failures", IEEE Transactions on Antennas and Propagation, Oct. 1991, vol. 39, No. 10, pp. 1497-1504.

* cited by examiner

*Primary Examiner*—Joseph Feild
*Assistant Examiner*—Phuoc Doan
(74) *Attorney, Agent, or Firm*—Squire Sanders & Dempsey L.L.P.

(57) ABSTRACT

The invention relates to compensation of a radiation pattern in a radio system. The solution comprises forming a primary radiation pattern by weighting signals of antenna branches with primary weights. The primary radiation pattern is compensated with a compensating radiation pattern after one or more antenna branches have been disconnected. The solution enables operation of the radio system without interruptions in certain fault situations of the base station.

3 Claims, 4 Drawing Sheets

COMPENSATING FOR RADIATION PATTERN IN RADIO SYSTEM, AND RADIO SYSTEM

FIELD

Figure 1:
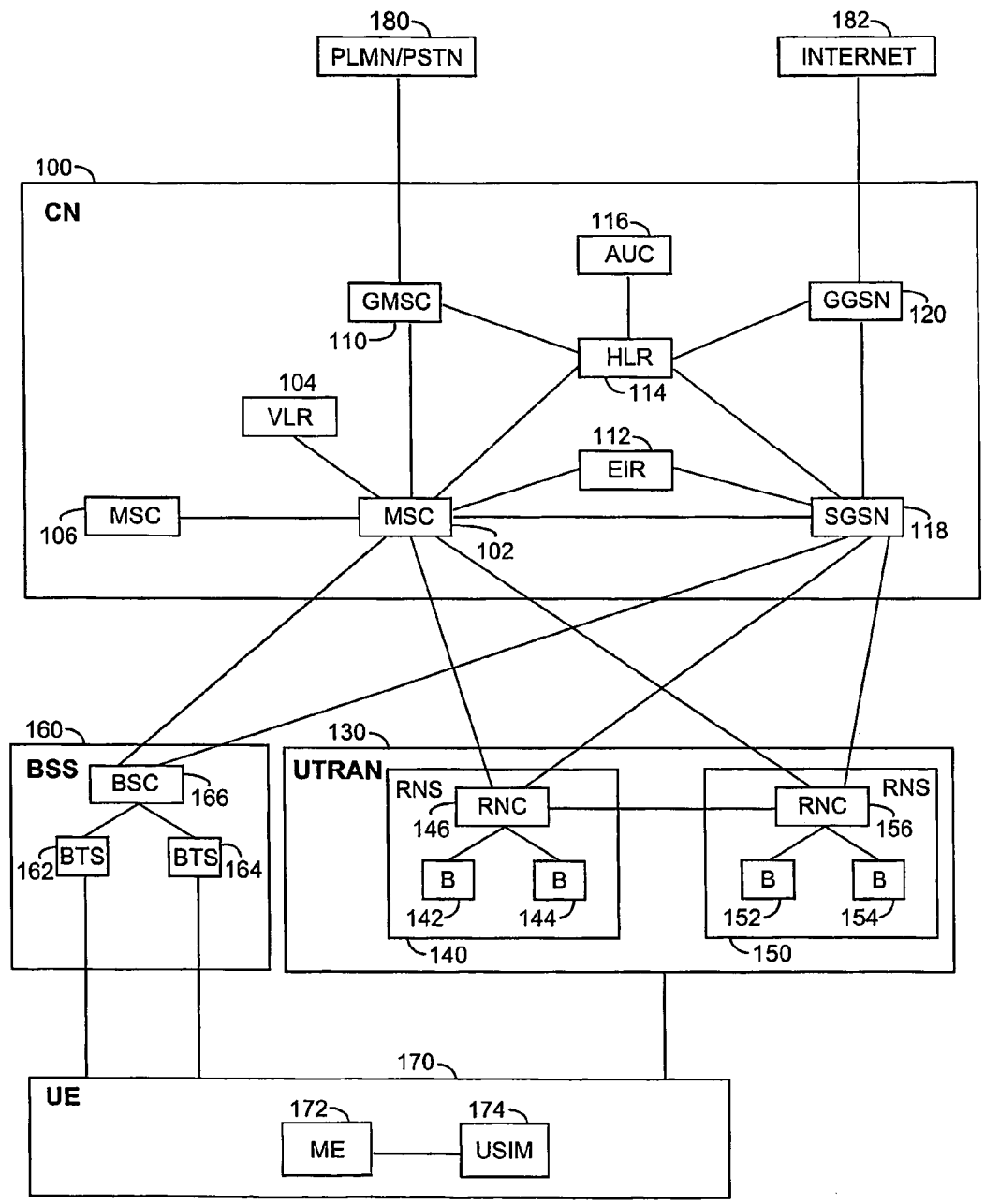

The invention relates to a method of compensating for a radiation pattern in a base station of a radio system and to a radio system and a base station implementing the method.

BACKGROUND

As wireless data transmission will become more common in the future and the number of users will grow, it is essentially important to increase the capacity of systems by improving their performance. One way of enhancing the performance of a radio system is to use radiation patterns in the transmission and reception of a base station that have been designed for the base station environment according to the need for data transmission capacity and that are typically formed by means of an antenna configuration consisting of one or more antenna elements by weighting signals of different antenna branches. The radiation patterns typically comprise two or more beams which can be associated with beam-specific coding. In an ideal case, each beam thus enables a separate physical radio channel, which reduces the multi-use interference that impairs the performance of the radio system. The properties of the radiation pattern are sensitive to changes in antenna branches caused by interference in the supply electronics of the antenna elements, for example.

In a prior art solution, the interference in the antenna branches are eliminated by service personnel dispatched to the scene.

One problem associated with the prior art solution is that there is a delay between interference at a base station and elimination of this interference. In that case the base station may function with a deficient radiation pattern for a long time, which may increase the multi-use interference and drastically reduce the performance of the radio system.

BRIEF DESCRIPTION

An object of the invention is to provide an improved method of compensating for a radiation pattern in a radio system, the method comprising: forming a primary radiation pattern by weighting signals of at least two functional antenna branches of a base station. The method is characterized by disconnecting at least one antenna branch and forming a radiation pattern which compensates for the primary radiation pattern by weighting signals of the functional antenna branches.

Another object of the invention is to provide an improved method of weighting signals in a radio system, the method comprising: weighting signals of at least two functional antenna branches of a base station with primary weights to form a primary radiation pattern. The method is characterized by disconnecting at least one antenna branch and weighting signals of the functional antenna branches with weights which compensate for the primary weights to form a compensating radiation pattern.

Another object of the invention is to provide an improved radio system comprising: a base station for forming a radio interface of the radio system; the base station comprises at least two antenna branches for establishing a radio link to terminals; each antenna branch comprises at least one antenna element for forming an antenna array; and the base station comprises means for weighting signals of the functional antenna branches to form a primary radiation pattern. The radio system is characterized in that the base station is arranged to disconnect at least one antenna branch and the weighting means are arranged to weight signals of the functional antenna branches to form a radiation pattern which compensates for the primary radiation pattern.

Still another object of the invention is to provide a base station of a radio system, comprising: at least two antenna branches for establishing a radio link to terminals, each antenna branch comprising at least one antenna element for forming an antenna array; weighting means for weighting signals of the functional antenna branches for forming a primary radiation pattern, wherein the base station is arranged to disconnect at least one antenna branch; and wherein the weighting means are arranged to weight signals of the functional antenna branches to form a radiation pattern which compensates for the primary radiation pattern.

The invention is based on the idea that when interference occurs in an antenna branch, this antenna branch is disconnected and signals of the remaining antenna branches are weighted so that the resulting radiation pattern replaces the original radiation pattern.

One feature of the invention is that the radio system remains functional even in an interference situation. Another feature of the invention is that it can be implemented by software.

LIST OF FIGURES

Figure 2:
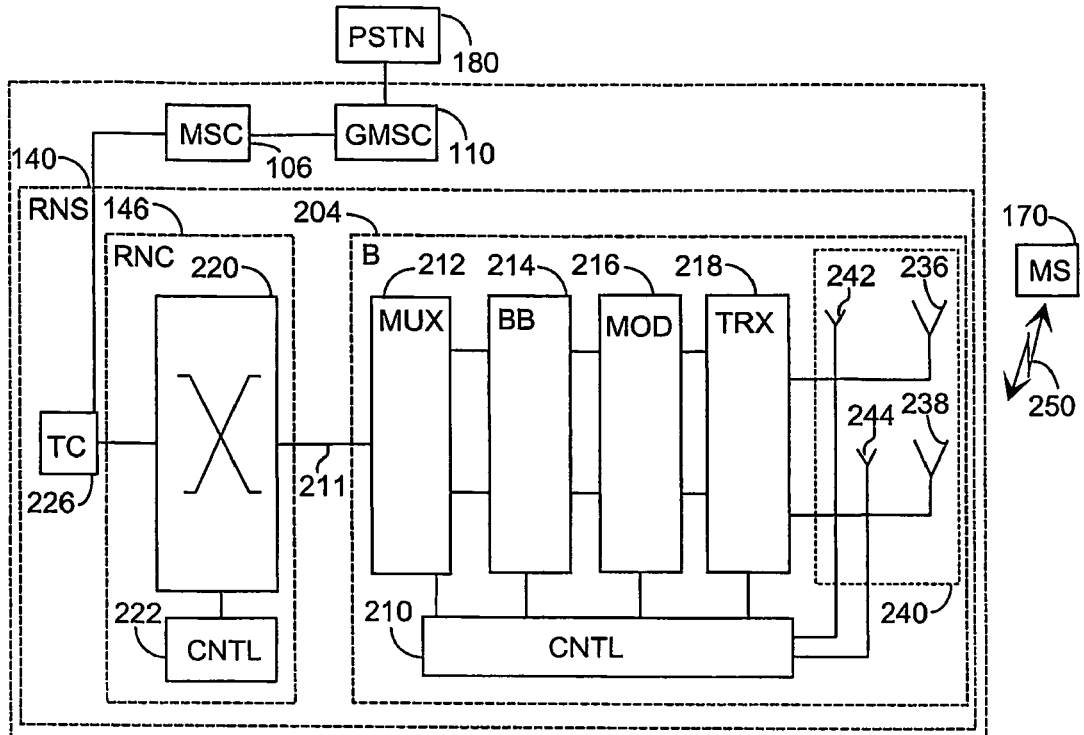
Figure 3:
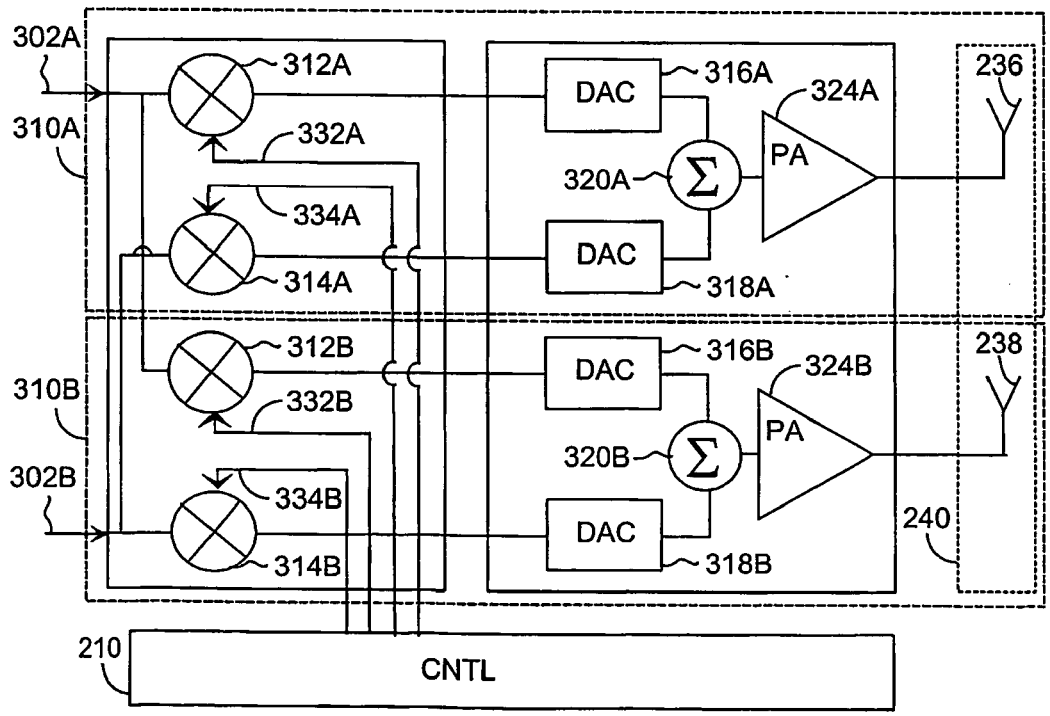
Figure 4:
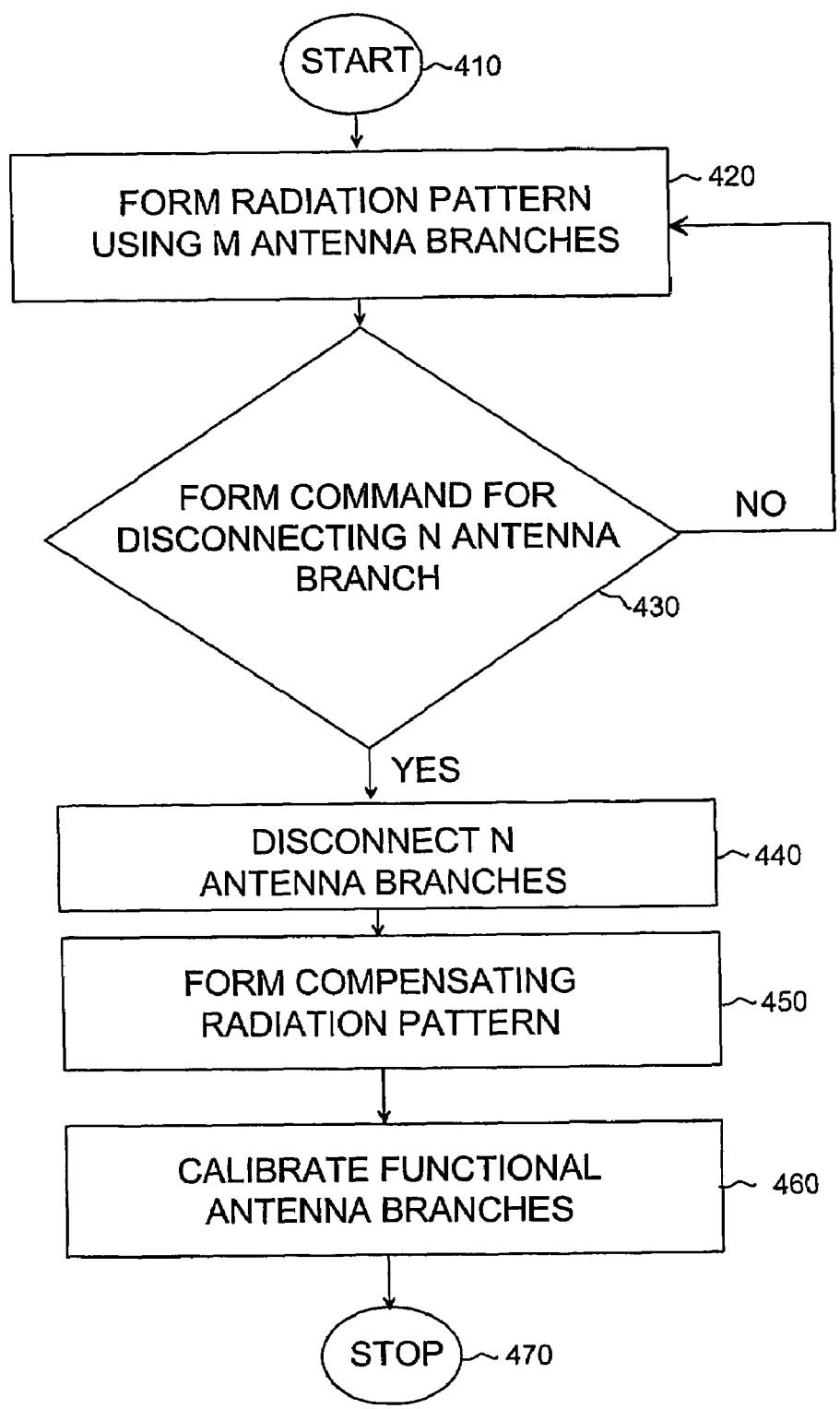
Figure 5:
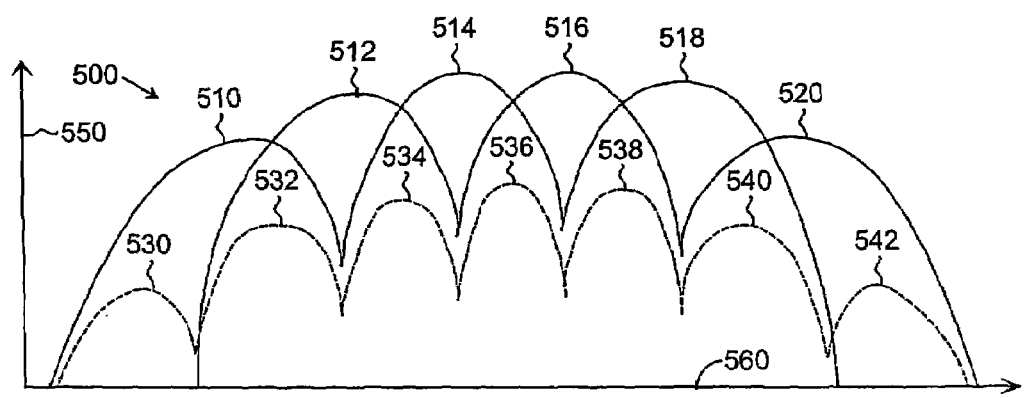
Figure 6:
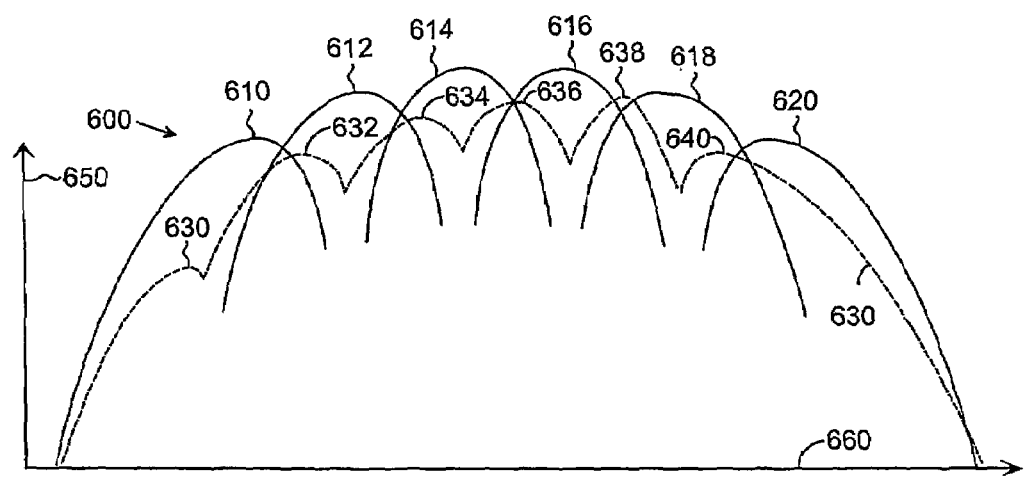
Figure 7:
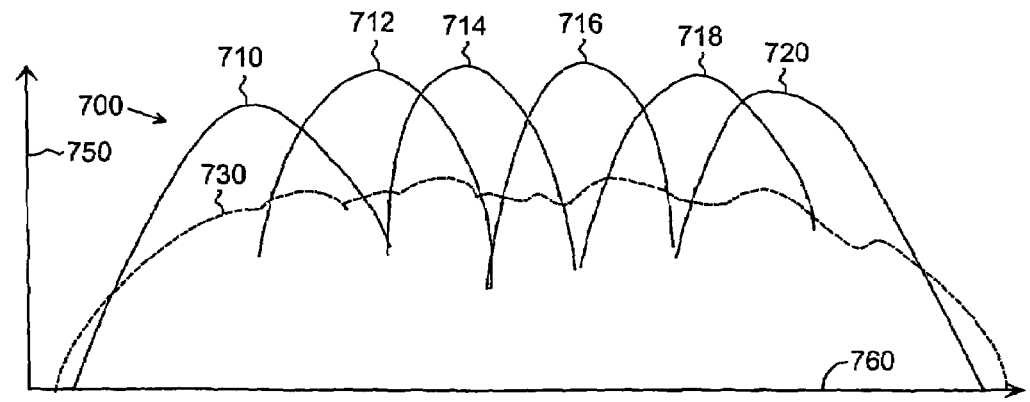

The invention will now be described in greater detail by means of preferred embodiments with reference to the accompanying drawings, in which FIG. 1 is a simplified block diagram of the structure of a telecommunications system, FIG. 2 is a second simplified block diagram illustrating the structure of a telecommunications system, FIG. 3 is a block diagram illustrating blocks of a base station, FIG. 4 is a block diagram illustrating the present solution, FIG. 5 illustrates an example of a radiation pattern formed by the base station, FIG. 6 illustrates a second example of a radiation pattern formed by the base station, and FIG. 7 illustrates a third example of a radiation pattern formed by the base station.

DESCRIPTION OF THE EMBODIMENTS

The embodiments described are applicable to telecommunications systems. An example of such telecommunications systems is the wide-band WCDMA radio system that utilizes spread-spectrum data transmission. In the following, embodiments will be described using GSM/GPRS and UMTS radio systems as examples without limiting the invention to these systems, as is obvious to a person skilled in the art.

FIG. 1 illustrates the structure of radio systems in a simplified manner on the level of network elements. The structure and functions of the network elements are illustrated rather cursorily since they are known per se. The radio-independent layer of the telecommunications system is represented by a core network CN 100. Radio systems are illustrated by a first radio system, i.e. a radio access network UTRAN 130, and a second radio system, i.e. a base station system BSS 160. The term 'UTRAN' is an abbreviation from UMTS (Universal Mobile Telephone System) Terrestrial Radio Access Network, i.e. the radio access network 130 is implemented by the wideband code division multiple access technique (WCDMA). The figure also shows user equipment UE 170. The base station system 160 is implemented by the time division multiple access technique (TDMA).

On a general level, the radio system can also be defined to comprise user equipment, which is also known as a subscriber terminal or a mobile phone, for instance, and a network part, which comprises the fixed infrastructure of the radio system, i.e. the core network, radio access network and base station system.

The structure of the core network 100 corresponds to a combined structure of the GSM (Global System for Mobile Communication) and GPRS (General Packet Radio Service) systems. The GSM network elements are responsible for establishing circuit-switched connections, and the GPRS network elements are responsible for establishing packet-switched connections; some of the network elements are, however, included in both systems.

A mobile services switching centre (MSC) 102 is the centre point of the circuit-switched side of the core network 100. The same mobile services switching centre 102 can be used to serve the connections of both the radio access network 130 and the base station system 160. The tasks of the mobile services switching centre 102 include: switching, paging, user equipment location registration, handover management, collection of subscriber billing information, encryption parameter management, frequency allocation management, and echo cancellation. The number of mobile services switching centres 102 may vary: a small network operator may only have one mobile services switching centre 102 but large core networks 100 may have several ones.

Large core networks 100 may have a separate gateway mobile services switching centre (GMSC) 110, which is responsible for circuit-switched connections between the core network 100 and external networks 180. The gateway mobile services switching centre 110 is located between the mobile services switching centres 102, 106 and the external networks 180. The external network 180 can be for instance a public land mobile network (PLMN) or a public switched telephone network (PSTN).

A home location register (HLR) 114 comprises a permanent subscriber scriber register, i.e. the following information, for instance: an international mobile subscriber identity (IMSI), a mobile subscriber ISDN number (MSISDN), an authentication key, and when the radio system supports GPRS, a packet data protocol (PDP) address.

A visitor location register (VLR) 104 contains roaming information on user equipment 170 in the area of the mobile services switching centre 102. The visitor location register 104 comprises almost the same information as the home location register 114, but in the visitor location register 104, the information is kept only temporarily.

An equipment identity register (EIR) 112 comprises the international mobile equipment identities (IMEI) of the user equipment 170 used in the radio system, and a 'white list', and possibly a 'black list' and a 'grey list'.

An authentication centre (AuC) 116 is always physically located in the same place as the home location register 114, and it comprises a subscriber authentication key Ki and a corresponding IMSI.

The network elements shown in FIG. 1 are functional entities whose physical implementation may vary. Usually, the mobile services switching centre 102 and the visitor location register 104 constitute one physical device while the home location register 114, equipment identity register 112 and the authentication centre 116 constitute another physical device.

A serving GPRS support node (SGSN) 118 is the centre point of the packet-switched side of the core network 100. The main task of the serving GPRS support node 118 is to transmit and receive packets together with the user equipment 170 supporting packet-switched transmission by using the radio access network 130 or the base station system 160. The serving GPRS support node 118 contains subscriber and location information related to the user equipment 170.

A gateway GPRS support node (GGSN) 120 is the packet-switched side counterpart to the gateway mobile services switching centre 110 of the circuit-switched side with the exception, however, that the gateway GPRS support node 120 must also be capable of routing traffic from the core network 100 to external networks 182, whereas the gateway mobile services switching centre 110 only routes incoming traffic. In our example, external networks 182 are represented by the Internet.

The first radio system, i.e. the radio access network 130, consists of radio network subsystems RNS 140, 150. Each radio network subsystem 140, 150 consists of radio network controllers RNC 146, 156 and B nodes 142, 144, 152, 154. Since the B node is rather an abstract concept, the term base station, to which the B node corresponds, is frequently used instead.

The radio network controller 146 controls the B nodes 142, 144 belonging to it. In principle, the devices implementing the radio path and their functions should be in B nodes 142, 144 while the control devices should be in the radio network controller 146.

The radio network controller 146 is responsible for the following tasks, for instance: radio resource management of the B node 142, 144, inter cell handovers, frequency management, i.e. allocation of frequencies to the B nodes 142, 144, management of frequency hopping sequences, measurement of time delays on the uplink, implementation of the operation and maintenance interface, and power control.

The B node 142, 144 includes at least one transceiver for implementing the WCDMA radio interface. Typically, the B node serves one cell, but also a solution where one B node serves several sectored cells is feasible. The diameter of a cell may range between a few meters and dozens of kilometers. The tasks of the B node 142, 144 include: calculation of timing advance (TA), uplink measurements, channel coding, encryption, decryption, and frequency hopping.

The second radio system, i.e. the base station system 160, consists of a base station controller BSC 166 and base transceiver stations BTS 162, 164. The base station controller 166 controls the base transceiver stations 162, 164. In principle, the devices implementing the radio path and their functions should be included in the base stations 162, 164, while the control devices should be included in the base station controller 166. The base station controller 166 is responsible for substantially the same tasks as the radio network controller 146.

The base station 162, 164 includes at least one radio transceiver where each carrier has eight time slots, i.e. the transceiver establishes eight physical channels on each carrier. Typically, one base transceiver station 162, 164 serves one cell, but also a solution where one base transceiver station 162, 164 serves several sectored cells is feasible. The base transceiver station 162, 164 also comprises a transcoder for converting the speech coding format used in the radio system to that used in the public switched telephone network. In practice, however, the transcoder is physically located in the mobile services switching centre 102. The base transceiver station 162, 164 has the same tasks as the B node.

The subscriber terminal 170 consists of two parts: mobile equipment (ME) 172 and a UMTS subscriber identity module (USIM) 174. The USIM 174 includes information on the user and particularly on data security, e.g. an encryption algorithm. The subscriber terminal 170 comprises at least one transceiver for establishing a radio link to the radio access network 130 or base station system 160. The subscriber terminal 170 may comprise at least two different subscriber identity modules. The subscriber terminal 170 further comprises an antenna, a user interface and a battery.

The description shown in FIG. 1 is rather general, so FIG. 2 shows a more detailed example of a cellular radio system. FIG. 2 comprises only the most essential blocks, but it is obvious to one skilled in the art that a conventional cellular radio network also comprises other functions and structures that need not be explained in closer detail here. The details of a cellular radio system may differ from those shown in FIG. 2, but these differences are irrelevant to the invention.

FIG. 2 shows a mobile services switching centre 106, a gateway mobile services switching centre 110, which is responsible for the connections of the mobile communication system to the external world, here to the public telephone network 180, and a network part 200 and terminals 170.

The network part 200 of the cellular radio network comprises base transceiver stations 204. A base transceiver station corresponds to a node B 142, 144 of FIG. 1. Several base transceiver stations 204 are controlled in a centralized manner by a radio network controller 146 communicating with the base transceiver stations and comprising a group switching field 220 and a control unit 222. The group switching field 220 is used for switching speech and data and for connecting signalling circuits. The control unit 222 carries out call controlling, mobility management, collection of statistics, signalling and control and management of resources.

The base transceiver station 204 and the radio network controller 146 constitute a radio network subsystem 140, which further comprises a transcoder 226, which converts different digital speech encoding formats used between a public telephone network and a radio telephone network into compatible ones, e.g. from the format of the fixed network into another format of the cellular radio network, and vice versa.

The base transceiver station 204 comprises a control unit 210, a multiplexer unit 212, a base band block 214, a modulator block 216, a transceiver block 218 and an antenna array 240.

The multiplexer unit 212 is used for arranging the traffic and control channel used by the transceiver block 218 in reception onto one transmission connection 211. In transmission, one transmission connection 211 is divided between the traffic and control channels used by the transceiver block 218.

The base band block 214 (BB) includes a digital signal processor, ASIC circuits (application specific integrated circuit), routes, memory means and software e.g. for encoding and decoding signals, performing error correction functions and possibly for interleaving and deinterleaving bits. In the base band block 214 the complex weighting of antenna signals can also be performed digitally.

The control unit 210 controls the function of the transceiver block 218, base band block 214 and multiplexer 212. The control unit 210 determines, for example, antenna weights which are used for weighting and phasing the signals of the antenna array 240 in reception and transmission.

The antenna array 240 forms a phased antenna array, which comprises at least two antenna elements 236, 238 for establishing a radio link 250 to the terminal 170. The antenna elements 236, 238 of the phased antenna array may constitute a coherent electromagnetic field whose level curves form a beam-like radiation pattern. In a phased antenna array, the distance between the antenna elements 236, 238 is typically about half of the radio wave length used in the radio system, in which case antenna beams can be guided in a sector of ±90° without intra-sectoral phantom beams. The antenna elements 236, 238 can be configured into a linear antenna array (ULA, Uniform Linear Antenna Array), where the phase difference between the antenna elements 236, 238 depends linearly on their location in the antenna array 240 and on the properties of the radio channel, such as the angle dispersion. In a planar manner, it is possible to form a CA (Circular Array), for example, where the antenna elements are arranged on the same level, e.g. circumferentially and horizontally. In that case a certain part of the circumference of a circle is covered, e.g. 120 degrees or even the full 360 degrees. In principle, the abovementioned uniplanar antenna structures can also be implemented as two-dimensional or even as three-dimensional structures. A two-dimensional structure is produced by arranging ULA structures in parallel, for example, in which case the antenna elements form a matrix. The present solution is not restricted to typical linear antenna arrays but it can also be applied to non-linear and other antenna arrays. In this application the antenna elements 236, 238 are denoted by index k whose values are determined within the following limits $2 \leq k \leq M$ and $M > 1$.

The antenna array 240 can be used for forming a grid of fixed beams, for example, where each beam forms a separate area in the coverage area of the base station 204. This area may overlap partly or completely with the other beams.

In addition to the fixed beam method, the phased antenna array can be used for 'user-specific beamforming', where the signal of each user is to be transmitted by a narrow beam in the direction of the terminal 170. In the user-specific beamforming, one also tries to follow the movement of the terminal 170. A high data transmission capacity is achieved, the coverage area of the base station 204 grows and the interference between channels decreases both in the fixed and in the user-specific beamforming. FIG. 2 further illustrates calibration sensors 242, 244 for calibrating the antenna array.

FIG. 3 illustrates an example of complex weighting of antenna signals in the base band block 214 of the base station 204 and of the structure of the transceiver block in principle. For the sake of clarity, FIG. 3 shows only the transmission sequence of signals, from which a person skilled in the art can easily construe a receiver sequence. The transceiver block 218 comprises digital/analogue converters 316A, 318A, 316B, 318B for converting signals transmitted from the antenna array 240 into analogue form. FIG. 3 further illustrates power amplifiers 322A, 322B for amplifying signals to be supplied to the antenna elements 236, 238. The transceiver block 218 also comprises frequency converters for upconverting base band signals to the radio frequency, and radio frequency filters, but these are not shown in FIG. 3. Neither is the modulator block 216 described in greater detail for the sake of clarity.

Complex weighting of antenna signals 302A, 302B shown in FIG. 3 is implemented by complex multipliers 312A, 314A, 312B, 314B, with which the signals 302A, 302B of the base band block can be weighted digitally according to the weights 332A, 334A, 332B, 334B received from the control unit 210, for example. The complex multipliers 312A, 314A, 312A, 314B can be implemented by various modulator components, in the signal processor of the base band block 214 or by ASIC circuits of the base band block 214.

Referring to the example shown in FIG. 3, the functional entity formed by the transceiver block 218, modulator block 216 and antenna array 240 can be divided into antenna branches 310A, 310B. Each antenna branch 310A, 310B comprises at least one antenna element 236, 238 of the antenna array 240 and possibly analogue/digital converters 316A, 318A, 316B, 318B, adders 320A, 320B and power amplifiers 322A, 322B. Each antenna branch 310A, 310B is responsible for processing signals of the antenna elements 236, 238, e.g. weighting, digital/analogue conversion, amplification and filtering. The concept of the present solution is applicable both to receiving antenna branches and to transmitting antenna branches.

The function of one antenna branch 310A will be described with reference to FIG. 3. Signals 302A and 302B are supplied to the complex multipliers 312A, 312B of the antenna branch 310A and weighted digitally e.g. with weights 332A, 334A produced by the control unit 210 of the base transceiver station 204 or the radio network controller 146, for instance. Weighting can be carried out in the base band parts 214 f the base station 204 e.g. by dividing the signals 302A, 302B into complex and real parts, which are supplied to I and Q branches where the complex and real parts of the signals are weighted separately. This method is known as IQ multiplication. For the sake of clarity, FIG. 3 illustrates only one complex multiplier per signal 332A, 334A. After weighting, the weighted signals 302A, 302B are supplied to digital/analogue converters 316A, 318A, where they are converted into analogue form. After this, the analogue signals 302A, 302B are combined in the adder 320A, converted to the radio frequency in the radio frequency modulator and amplified in the power amplifier 320A. The amplified signal produced by the power amplifier 320A is supplied to the antenna element 236, which forms an electromagnetic component corresponding to weighting in the electromagnetic field formed by the antenna array 240. The signals 302A, 302B can also be weighted by weighting the analogue signal but this embodiment is not illustrated in FIG. 3. In the weighting of analogue signals 302A, 302B, the complex multipliers 216 can be placed between the digital/analogue converters 316A, 318A and the power amplifier 324A. In that case the complex multipliers form a 'phase transmission network', which can be controlled digitally. Each signal 302A, 302B to be weighted is supplied to the input of this network and a weighted signal is obtained from its output. Weighting can be carried out e.g. by changing amplification of the weighting amplifier by the weights 332A, 334A produced by the control unit 210 of the base station 204. The complex multipliers can also be placed after the power amplifiers 324A, 324B, in which case amplification weighting and amplitude weighting are achieved by using a purely analogue phase transmission network. However, also in this case phasing can be controlled digitally. It is obvious to a person skilled in the art that complex weighting can also be carried out in intermediate frequency parts, which are not shown in FIGS. 2 and 3 for the sake of clarity.

FIGS. 3 and 5 illustrate the general principle and mathematical presentation of signal weighting and generation of a radiation pattern by the antenna array 240. FIG. 5 shows an example of a radiation pattern 500 formed by the base station 204, the pattern comprising main beams 510-520 and a side lobe structure 530-542. The side lobe structure 530-542 is illustrated in a simplified manner: the curve presented by a broken line represents the strongest side beam. The vertical axis 550 represents the relative amplitude of the radiation pattern, for example, and the horizontal axis 560 the azimuth angle. The main beams 510-520 illustrated in FIG. 5 may be fixed but the present solution is not limited to fixed; instead, it can be modified according to the user's requirements and applied to dynamically directed beam structures. The weighting of antenna signals can be formulated mathematically by means of weighting factors. In that case the weighting factors are realized as weighting coefficients 332A, 334A, 332B, 334B illustrated in FIG. 3. Let M be the number of antennas 236, 238 in the antenna array 240 and M≧2, and let K be the number of main beams 510-520 formed by the antenna array 240. Signals to be supplied to different beams 510-520 are denoted by components $x_1, \ldots, x_K$ of vector X and weighted signals to be supplied to different antennas 236, 238 by components $y_1, \ldots, y_M$ of vector Y. Thus $$X = (x_1, x_2, \ldots, x_K)^T$$

$$Y = (y_1, y_2, \ldots, y_M)^T$$

where index T means transposition of the vector or the matrix. The following matrix equation is valid for vectors X and Y $$Y = VX,$$

where matrix V is the weighting matrix including weighting factors for different antennas 236, 238. The weighting matrix V can be defined as follows:

$$V = \begin{pmatrix} W_{1,1} & W_{1,2} & \cdots & W_{1,K} \\ W_{2,1} & W_{2,2} & \cdots & W_{2,K} \\ \vdots & \vdots & \ddots & \vdots \\ W_{M,1} & W_{M,2} & \cdots & W_{M,K} \end{pmatrix}.$$

The weighting factors may be relative, in which case they are normalized to one, i.e.

$$\sum_{m=1}^{M} W_{m,k}^2 = 1.$$

The weighting coefficients $W_{m,k}$ can be presented in a complex form $W_{m,k}(A_{m,k}, \phi_{m,k}) = A_{m,k} e^{i\Phi_{m,k}}$ where $A_{m,k}$ is the amplitude weighting of antenna element k of the antenna array 240 and $\Phi_{m,k}$ is the phase factor of antenna element k. The index m refers to the antenna beam. The phase factor $\Phi_{m,k}$ can be an absolute phase angle or a phase shift in relation to a phase angle of the reference antenna element. Symbol i is an imaginary unit and e is the Neper figure. The same amplitude weighting $A_{m,k}$ is often used for all signals and the desired radiation pattern is formed by means of the phase factors $\Phi_{m,k}$. The weighting coefficients $W_{m,k}$ are often selected so that orthogonal vectors, by means of which radiation patterns orthogonal to one another can be achieved, are formed in the matrix V. Orthogonal radiation patterns ensure as small correlation as possible between the radiation patterns, and thus improve the quality of diversity transmission and reception. At the same time the interference between the beams is minimized. The main beams 510-520 narrow as the number of antenna elements 236, 238 available increases. In addition, the weighting coefficients $W_{m,k}$ can be selected to realize the desired window or aperture function. The aperture function can be a Gaussian function or another raised cosine function, for example. The aperture function can be used for adjusting, for example, the dynamics of the main beam/side lobe structure of the antenna array 240. Here the radiation pattern of antenna array means the radiation pattern used both in the transmission and in the reception of a radio signal. The radiation pattern used in the transmission of a radio signal determines the signal power of transmission as a function of azimuth angle, whereas in the reception, it determines the receiving sensitivity of the antenna array as a function of azimuth angle. The radiation pattern of the antenna array can also be utilized in the elevation angle or simultaneously both in azimuth and elevation angles.

In the case of CDMA-based radio interface applications, beam-specific encoding can be applied to each signal to be transmitted to each main beam 510-520 of the radiation pattern 5 illustrated in FIG. 5. In an ideal situation, unambiguous encoding corresponds to each main beam 510-520 and thus the terminal 170 in the area of each main beam 510-520 does not catch signals from other beams. In reality, however, the side beams 530-543 interfere with the signals of the main beams 510-520, which reduces the dynamics of the radiation pattern 500. Correspondingly, a beam-specific identification signal, such as a pilot signal the terminals in the beam area utilize for estimating the radio channel, for example, can be transmitted to each main beam. Different beams may also have partly different coding; for example, the scrambling code of the CDMA is different in different beams but the channelisation codes are the same. The identification signal may be any signal that allows identification of the desired beam. For example, it may be a symbol sequence of the TDMA (Time Division Multiple Access) system, which forms a training sequence.

To achieve and maintain the desired beam structure, calibration operations can be performed on the antenna branches 310A, 310B. Calibration comprises determination and compensation of amplitude and phase distortion in the antenna branches 310A, 310B so that the amplitudes and phase distortion of the antenna branches 310A, 310B do not exceed their error limits. The need for calibrating the antenna array 240 typically arises from the fact that components of the antenna branches 310A, 310B, such as power amplifiers 310A, 310B, modulators 312A, 314A, 312B, 314B or antenna cables, do not function ideally. Calibration can be performed e.g. using two calibration sensor 242, 244 included in the antenna array 240 for measuring the signals 310A, 310B of the antenna branches. Calibration can also be performed as a routine at regular intervals.

FIG. 4 illustrates a flow chart according to the present solution. In the first block 410 the base station may be in any operation mode. In block 420 the base station 204 forms a primary radiation pattern 500 by weighting the signals of the $M^{th}$ antenna branch 310A, 310B using the IQ multiplication described above, for example. The primary radiation pattern 500 is formed e.g. by optimizing the weighting factors $W_{m,k}$ when M antenna branches 310A, 310B are used. In the following, the primary radiation pattern refers to the normal operation of the antenna array 240 here a desired number M of antenna branches of the antenna array are in use and they operate normally. The weights that form the primary radiation pattern 500 are called primary weights, which can be presented by a primary weighting matrix $V_P$.

In block 440 of the chart shown in FIG. 4, N antenna branches 310A, 310B are disconnected. In an embodiment, a command is formed in accordance with block 430 shown in FIG. 4 for disconnecting at least one antenna branch 310A, 310B in the base station 204 and the antenna branch 310A, 310B concerned is disconnected on the basis of the command formed. The command for disconnecting an antenna branch 310A, 310B can be formed in the control unit 210 of the base station 204 during calibration, for example. In that case it may appear that one of the antenna branches 310A, 310B cannot be calibrated with sufficient accuracy. This may result from a fault in the antenna element, antenna feeding cables or power amplifiers, for example. The command can also be given when the antenna branches are being serviced. In that case the antenna branch 310A, 310B is disconnected and a compensating radiation pattern 700 is used during the service. The command for disconnecting the antenna branch 310A, 310B can also be formed when a power amplifier 322A, 322B reports a failure. The failure report may be given e.g. when one transistor of a linear power amplifier becomes dysfunctional and the transmission power of the antenna branch 310A, 310B in question decreases, The reason for disconnecting an antenna branch 310A, 310B is not relevant to the invention as such.

The radiation pattern 600 shown in FIG. 6 illustrates a situation where one antenna branch 310A, 310B is disconnected but the other functional antenna branches 310A, 310B continue transmission using the same weights as earlier. In a common case, the number of disconnected antenna branches 310A, 310B is N, in which case the number of functional antenna branches 310A, 310B is M-N. FIG. 6 illustrates main beams 610-620, and, for the sake of clarity, the side lobe structure 630-640 represents the envelope of the strongest side beam. The vertical axis 650 represents the relative amplitude of the radiation pattern, for example, and the horizontal axis 660 the azimuth angle. In the situation illustrated in FIG. 6, the weights of the functional antenna branches 310A, 310B are not necessarily optimized to correspond to the M-N antenna branch 310A, 310B, and, compared to the primary radiation pattern 500, a clear change is noticed in the radiation pattern 600. The side lobe structure 630-640 has become stronger in relation to the main beams 610-620, which may result in a substantial decrease in the capacity of the radio system.

The solution described can be employed for reducing the problems caused by the radiation pattern 600 shown in FIG. 6. In that case, after the antenna branch 310A, 310B has been disconnected, a radiation pattern 700 which compensates for the primary radiation pattern 500 is formed in block 450 of FIG. 4 by weighting the signals of the functional antenna branches 310A, 310B. The signals are weighted by weights which compensate for the primary weights and can be presented by a weighting matrix $V^C$. The result is the radiation pattern 700 shown in FIG. 7, where the main beams 710-720 are clearly distinguished from the side lobe structure 710. The vertical axis 750 represents the relative amplitude of the radiation pattern, for example, and the horizontal axis 760 the azimuth angle. The radiation pattern 700 compensating for the primary radiation pattern 500 is formed by weighting signals of the antenna branches 310A, 310B to provide the compensating radiation pattern 700 with desired properties. The method ends in block 470 f FIG. 4. In that case the base station 204 may continue to function using the compensating radiation pattern 700. The compensating radiation pattern 700 is used until the disconnected antenna branches 310A, 310B are functional again. It may also happen that more antenna branches 310A, 310B need to be disconnected when the base station transmits using the compensating radiation pattern 700. In that case the method can be applied as described above.

In an embodiment, the compensating radiation pattern 700 is formed by weighting signals of functional antenna branches 310A, 310B by previously known weights. The previously known weights may be stored e.g. in the memory of the control unit 210 or in the memory of the radio network controller 146, from which they are loaded into the modulators 312A, 314A, 312B, 314B. The previously known weights can be presented by a matrix $V^C$ which include the weights, for instance. In that case the control unit 210 of the base station or the radio network controller 146 include a number of matrixes V, from which a matrix corresponding to the current compensation case is selected. The compensation case can be defined on the basis of the functional antenna branches 310A, 310B and the conditions set on the radiation pattern. A separate identification number, for example, can be allocated to each compensation case. The element that stores the compensating weights, such as the control unit 210, transmits the weighting coefficients corresponding to the compensation case to the modulator 216 according to the identification number. The compensation case can be identified in the control unit 210 by means of the calibration information or state information on the power amplifiers, for instance. The calibration information may consist of a calibration report, for example, which shows the accuracy of the calibration of each antenna branch 310A, 310B. In an embodiment, the primary radiation pattern 500 is fixed, and thus the compensating radiation pattern 700 is also fixed. In that case the compensation case is determined linearly according to a functional antenna configuration. In addition, primary weighting coefficients used for forming the primary radiation pattern can be employed for identifying the compensation case. The last-mentioned issue is important when one compensates for a user-specific antenna beam whose direction is not pre-determined, and thus the information on disconnected antenna branches 310A, 310B is not necessarily sufficient for forming the compensating radiation pattern 700. In that case a large number of compensating radiation patterns and corresponding antenna weighting coefficients must be available, from which a suitable one is selected using information obtained on primary antenna weighting coefficients. This information implicitly includes information on the direction of the radiation pattern 500 to be compensated for. A desired number of compensating radiation patterns can be calculated in advance to achieve the desired directional accuracy. For example, if one wants to direct a transmitting/receiving beam with an accuracy racy of 5 degrees in the direction of the terminal, 24 radiation patterns are needed in a sector of 120 degrees, i.e. one for each feasible direction. The present solution thus enables rapid and case-specific compensation of a radiation pattern. The terminals 170 in the area of the base station 204 can operate without interruptions despite faults in antennas.

The weighting coefficients that produce the compensating radiation pattern 700 are formed e.g. by simulating radiation patterns and by processing the weighting coefficients to provide the radiation pattern with desired properties. The compensating antenna weighting coefficients can be determined in advance by the manufacturer or the administrator of the base station 204, for example. If the disconnected antenna element 236, 238 is one of the antenna elements 236, 238 at the edge of the antenna array 240, the compensating radiation pattern 700 can still be formed by primary weighting coefficients. It is particularly demanding to form the compensating radiation pattern 700 when a signal to be transmitted from one of the antenna elements 236, 238 in the middle of the antenna array 240 does not fulfill the set conditions and the linearity of the antenna array disappears. In that case the signals of the functional antenna branches 310A, 310B are weighted by compensating weighting coefficients which differ from the primary weighting coefficients.

In an embodiment the compensating radiation pattern 700 is formed by weighting signals of the functional antenna branches 310A, 310B with weights which are based on the configuration of the functional antenna elements 236, 238 in the antenna array 240. The antenna configuration comprises the number of antenna elements 236, 238 in the antenna array 240 and their physical positioning. In the selection of antenna weights, one may also consider the radiation pattern formed separately by the antenna elements 236, 238. This radiation pattern depends on the shape of a single antenna element 236, 238 and on the elements, such as reflectors, close to the antenna element 236, 238. The single antenna element 236, 238 is a dipole or a rectangular radiation element, known as a patch antenna. In addition, the aperture weighting function of the antenna array 240 may be taken into account when weights are determined. Case-specific conditions, which depend on the capacity required by a cell of the base station 204, can be set on the compensating radiation pattern 700 to be formed. As a general principle, the compensating radiation pattern 700 should correspond to the primary radiation pattern 500 as closely as possible. This situation is achieved relatively easily if the number of disconnected antenna branches 310A, 310B is small compared to the number of functional antenna branches 310A, 310B. In practice, however, this is not the case, but disconnection of even one antenna branch 310A, 310B may have a considerable effect on the quality of compensation of the primary radiation pattern 500. In that case properties that have priority over the other properties of the radiation pattern can be defined for the compensating radiation pattern 700. These properties include coverage area, number of main beams and dynamic range of the radiation pattern.

In an embodiment, the compensating radiation pattern 700 is formed by weighting signals of the functional antenna branches 310A, 310B so that the main beams 710-720 of the compensating radiation pattern 700 always overlap at least partly with the main beams 510-520 of the primary radiation pattern 500. In that case the radiation pattern 500 and the compensating radiation pattern 700 will have at least partly the same coverage area.

In an embodiment, at least one main beam 510-520 of the primary radiation pattern 500 is compensated with at least one main beam 710-720 of the compensating radiation pattern 700. In FIGS. 5 and 7, for example, main beam 514 of the radiation pattern 500 is compensated with main beam 714 of the compensating radiation pattern. This case may arise e.g. When a cell in the base station 204 has an area that requires a particularly high capacity. It is also feasible that each main beam of the radiation pattern 500 is compensated with the main beam of the compensating radiation pattern 700 as follows: main beam 510 with main beam 710, main beam 512 with main beam 712, main beam 514 with main beam 714, main beam 516 with main beam 716, main beam 518 with main beam 718, and main beam 520 with main beam 720.

In an embodiment, at least one main beam 510-520 of the primary radiation pattern 500 is compensated with at least one main beam 710-720 of the compensating radiation pattern 700 and the coding of the signals of each compensating main beam 710-720 is the same as the coding of the signals of the main beam 510-520 to be compensated for. The coding may be spreading coding of the CDMA-based (Code Division Multiple Access) radio system, which may comprise scrambling and/or channelisation coding. In FIGS. 5 and 7, for example, main beam 514 of the radiation pattern 500 is compensated with main beam 714 of the radiation pattern 700, and thus the traffic and pilot channels to be transmitted to the main beams 514 and 714 remain unchanged. In that case the terminal 170 in the area of the beams 514, 714 in question may continue to function without handover despite the compensation of radiation pattern.

In an embodiment, at least one main beam 710-720 of the primary radiation pattern 500 is compensated with one main beam 510-520 of the compensating radiation pattern 700 and the identification signal of the compensating main beam 710-720 is the same as the identification signal of the main beam (510-520) to be compensated for 500. The identification signal may be one of the pilots according to the 3GPP standard, for example.

In an embodiment, the compensating radiation pattern 700 is formed by weighting the signals of the functional antenna branches so that the dynamic range of the main beams 710-720 in the compensating radiation pattern 700 is optimized. The dynamic range can be optimized by increasing the amplitude of the main beams 710-720 in the compensating radiation pattern 700 in relation to the amplitude of the side lobe structure 730 by selecting a suitable weighting function of the antenna array 240 aperture, for example.

In an embodiment, after the compensating radiation pattern has been formed, the antenna branches 310A, 310B can also be calibrated according to block 460 of FIG. 4 to improve the radiation pattern 700. Calibration can be performed as was described above. In an embodiment, the radiation pattern 700 compensating for the primary radiation pattern 500 is formed so that compensation is performed in the azimuth direction. In this case the antenna array to be used comprises horizontally arrayed antenna elements which are weighted to compensate for the radiation pattern.

In another embodiment, the radiation pattern 700 compensating for the primary radiation pattern 500 is formed so that compensation is performed in the elevation direction. In that case, the antenna array to be used comprises vertically arrayed antenna elements which are weighted to compensate for the radiation pattern.

The above-mentioned instances of compensation in the elevation direction and in the azimuth direction can also be combined, in which case the radiation pattern is compensated in every direction.

The solution described can be applied to reception and transmission in a base station. In an embodiment, the primary radiation pattern 500 is the radiation pattern used in transmission, the disconnected antenna branch is the transmitting antenna branch, and the compensating radiation pattern 700 is the radiation pattern used in transmission.

In another embodiment, the primary radiation pattern 500 is the radiation pattern used in reception, the disconnected antenna branch is the receiving antenna branch, and the compensating radiation pattern 700 is the radiation pattern used in reception. Compensation of the receiving radiation pattern and weighting of the receiving signals can be presented e.g. as the block diagram illustrated in FIG. 3 where the direction of signals has been reversed from antenna arrays 240 to complex multipliers 312A, 314A, 312B, 314B. In that case the received signal is weighted in the complex multipliers 312A, 314A, 312B, 314B. Other functions, such as amplification and digital/analogue conversion, are known per se to a person skilled in the art.

A situation where the transmitting antenna branch has been disconnected will be described now. If the antenna configuration and the antenna weights used in reception remain unchanged, the receiving radiation pattern will be different from the transmitting radiation pattern. This situation may cause problems in the location of terminals and allocation of radio resources to users, for example. In that case signals of the receiving antenna branches can be re-weighted using a radiation pattern in reception that corresponds to the compensating radiation pattern 700 used in transmission as closely as possible. The correspondence means, for example, that at least one transmitting antenna beam and one receiving antenna beam overlap. The new weighting of antennas used in reception can be implemented as follows, for example: one weighting matrix of a receiving antenna, which is loaded e.g. from the control unit 210 of the base station, corresponds to each weighting matrix of a transmitting antenna when the transmitting antenna branch is disconnected. The weighting matrix of the receiving antenna used in reception can be formed by the same methods as the weighting matrix of the transmitting antenna. The corresponding function can be performed when the antenna branch employed in reception is disconnected and the compensating radiation pattern is the radiation pattern used in reception. In that case signals of the transmitting antenna branches are weighted as described above so that the radiation pattern used in transmission corresponds to the compensating radiation pattern used in reception.

In an embodiment, the compensating weights used on the downlink and on the uplink are the same. This embodiment is particularly suitable for a radio interface which employs the TDD technique (Time Division Duplex). In that case, the direction estimate of the terminal 170, for example, can be formed reliably using the same antenna weights of the uplink and the downlink. However, the above-mentioned method cannot necessarily be applied in a radio interface based on the FDD technique (Frequency Division Duplex) due to the difference in the radio frequency between the uplink and the downlink, i.e. due to a 'duplex frequency'. In that case a separate uplink antenna weighting corresponds to each compensating downlink antenna weighting. The uplink antenna weighting can be formed in the same manner as the downlink antenna weighting using simulations.

Even though the invention was described above with reference to the example according to the accompanying drawings, it is clear that the invention is not limited to this example, but it may be modified in various ways within the inventive concept disclosed in the appended claims.

The invention claimed is:

1. A method of compensating for a radiation pattern in a radio system, the method comprising:
    forming a primary radiation pattern by weighting signals of at least two functional antenna branches of a base station;
    disconnecting at least one antenna branch;
    forming a radiation pattern that compensates for the primary radiation pattern by weighting signals of the functional antenna branches; and
    forming the compensating radiation pattern by weighting signals of the functional antenna branches so that at least one main beam of the primary radiation pattern is compensated with one main beam of the compensating radiation pattern and the identification signal of the compensating main beam is the same as the identification signal of the main beam to be compensated for.

2. A radio system comprising:

a base station configured to form a radio interface of the radio system;

the base station comprises at least two antenna branches for establishing a radio link to terminals;

each antenna branch comprises at least one antenna element configured to form an antenna array; and the base station comprises a weighting unit configured to weight signals of the functional antenna branches configured to form a primary radiation pattern, wherein the base station is configured to disconnect at least one antenna branch;

wherein the weighting unit is configured to weight signals of the functional antenna branches to form a radiation pattern that compensates for the primary radiation pattern, and wherein the weighting unit is configured to weight signals of the functional antenna branches so that at least one main beam of the primary radiation pattern is compensated with one main beam of the compensating radiation pattern and the identification signal of each compensating main beam is the same as the identification signal of the main beam to be compensated for.

3. A base station of a radio system, comprising:

at least two antenna branches for establishing a radio link to terminals, each antenna branch comprising at least one antenna element for forming an antenna array; and a weighting unit configured to weight signals of the functional antenna branches to form a primary radiation pattern, wherein the base station is configured to disconnect at least one antenna branch, wherein the weighting unit is configured to weight signals of the functional antenna branches to form a radiation pattern that compensates for the primary radiation pattern, and wherein the weighting unit is configured to weight signals of the functional antenna branches so that at least one main beam of the primary radiation pattern is compensated with one main beam of the compensating radiation pattern and the identification signal of each compensating main beam is the same as the identification signal of the main beam to be compensated for.

* * * * *